W. S. FEENY.
HOSE CLAMP.
APPLICATION FILED SEPT. 30, 1911.
1,116,049.
Patented Nov. 3, 1914.
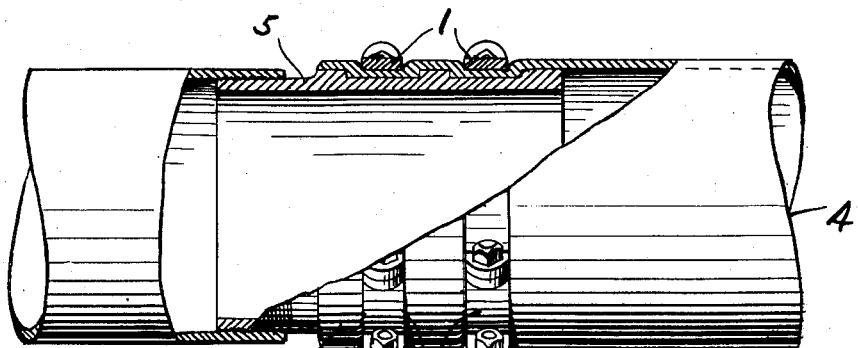
FIG. 1.
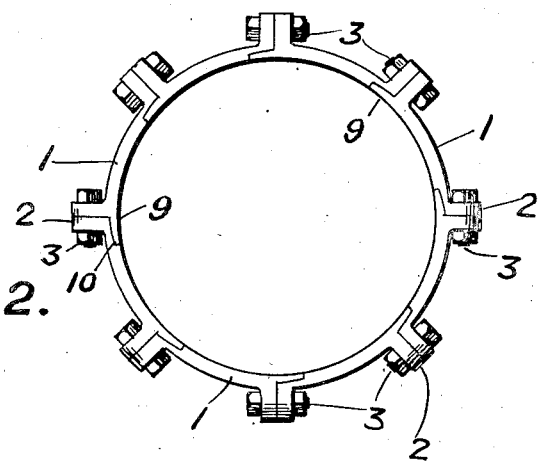
FIG. 2.
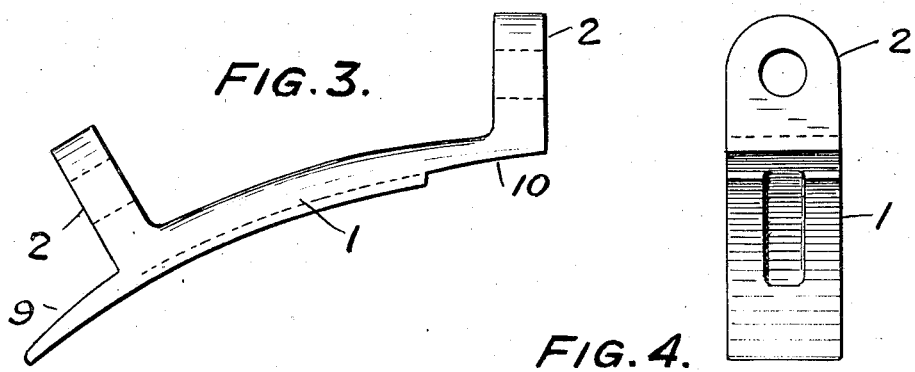
FIG. 3.
FIG. 4.
WITNESSES:
INVENTOR
William S. Feeny
BY
Augustus B. Stoughton.
ATTORNEY.

UNITED STATES PATENT OFFICE.

WILLIAM S. FEENY, OF PHILADELPHIA, PENNSYLVANIA, ASSIGNOR TO KNOX MANUFACTURING COMPANY, OF PHILADELPHIA, PENNSYLVANIA, A CORPORATION OF PENNSYLVANIA.

HOSE-CLAMP.

1,116,049.  Specification of Letters Patent.  Patented Nov. 3, 1914.

Application filed September 30, 1911. Serial No. 652,143.

*To all whom it may concern:*

Be it known that I, WILLIAM S. FEENY, a citizen of the United States, and a resident of Philadelphia, in the county of Philadelphia and State of Pennsylvania, have invented certain new and useful Improvements in Hose-Clamps, of which the following is a specification.

The objects of the present invention are to provide a clamp which can be adjusted to accommodate hose differing considerably in diameter, and to provide a clamp which shall operate or bind uniformly all around the surface of the hose.

The invention will be claimed at the end hereof, but will be first described in connection with the accompanying drawings, in which—

Figure 1, is a side view, with parts broken away, illustrating a clamp embodying features of the invention. Fig. 2, is a view of the clamp, and Figs. 3 and 4, are respectively, a side and an end view of one of the links of the clamp.

The hose clamp comprises a circular or endless chain of duplicate links 1, each provided with ears 2 and also bolts and nuts 3 connecting the ears. The described chain can be applied to the outside of the hose 4 after the latter has had inserted into it the coupling 5. This can be accomplished by removing one or more of the nuts and bolts 3 and replacing them after the clamp is in position on the hose.

By screwing up the various nuts, it is evident that clamping pressure can be brought to bear evenly all around the surface of the hose. If desired links 1 may be added or taken from the chain clamp so as to accommodate it to hose and couplings of different sizes.

It will be seen by reference to the drawings that the duplicate links overlap, that is, the projections 9, occupy the recesses 10, and this is advantageous in clamping hose and in applying pressure at many points around its surface.

The projections 9 underlap the recesses 10 and are in sliding engagement therewith. The projections 9 present flat surfaces of the width of the links on the inside of the clamp, thus protecting the hose. Since the clamp binds uniformly all around the surface of the hose when the nuts are screwed up it follows that the links are sprung to conform to and so clamp all around that surface.

What I claim is:

A hose clamp comprising in combination a circular chain of links having recesses and projections which underlap the recesses and are in sliding engagement therewith and present flat surfaces of the full width of the links on the inside of the clamp, ears on the links, and bolts and nuts connecting said ears and operating with the projections and recesses and the links to clamp all around the surface of a hose.

In testimony whereof I have hereunto signed my name.

WM. S. FEENY.

Witnesses:
  K. M. GILLIGAN,
  FRANK E. FRENCH.